United States Patent Office 3,210,646
Patented Oct. 5, 1965

3,210,646
AUTOMATIC ERROR SENSING POINT SWITCH-ING CIRCUITS FOR ELECTRONICALLY REGU-LATED POWER SUPPLY
Harry E. Schauwecker, Portuguese Bend, Calif., assignor to Valor Electronics Incorporated, Gardena, Calif., a corporation of California
Filed June 6, 1960, Ser. No. 34,123
3 Claims. (Cl. 323—9)

This invention relates generally to electrical regulator circuits. More specifically, the invention to be described in this specification relates to electronic voltage regulator devices capable of close tolerance regulation.

It is well known in the art that an important corollary to close tolerance voltage regulation is the maintenance of low output impedance as present at the output terminals of a power supply system. It may be said in fact, that the closer a source of voltage is regulated against variations, the more nearly its output impedance may be regarded as equal to zero.

In the practice of the electronic arts it is often important that a load or utilization device should not be subjected to excessive currents. Since the introduction of the transistor, this device has grown steadily to a point where its use is general in virtually all classes of electronic devices. Electronic devices utilizing transistors are often more subject to inherent damage than vacuum tube circuits whenever a malfunction causes them to draw excessive currents from their sources of power, and there are also many other types of instruments and miscellaneous electrical and electronic devices which must be protected against current surges. Thus the use of short circuit protective and current limiting devices has become common in connection with transistorized devices particularly and some other devices as well. Often the protective device may be nothing more sophisticated than a fuse or common circuit breaker. In other cases an elaborate current limiting or short circuit protection device capable of operating in as short a time as a few microseconds may be used. The choice of protective devices is a matter dictated by design considerations, and forms no part of the present invention. In addition to the well known protective devices such as the fuse and circuit breaker referred to above, a genus of fast acting devices are described in the United States patent application Serial No. 841,306, filed September 21, 1959, by Harry E. Schauwecker and entitled, "Means and Techniques for Providing Short Circuit Protection and Current Limiting in a Direct Current Circuit." The type of device described therein is applicable as a type of current limiting or short circuit protection device for use in connection with the present invention.

It will be realized that the placement of a protective device in series with the circuit between a voltage regulator and a load or utilization device has the effect of adding its impedance to the effective output impedance of the power supply and regulator combination. The advantage of considerable engineering care in designing power supply regulator systems exhibiting output impedances of the order of a fraction of an ohm is thereby seriously diluted when the protective device impedance is interposed between the regulator or source and a load or utilization device. Moreover, the placement of a protective device ahead of the regulator, that is between the primary source or rectifier filter combination and the regulator circuitry, results in several serious disadvantages. First, the protection circuitry must be capable of withstanding voltages and power resulting from the input voltage variations ahead of the regulator. If the protection circuitry is of a transistorized type or certain other relatively sophisticated configurations, this can be a substantial disadvantage. A second disadvantage occurs in that the placement of protection circuitry ahead of a regulator may have the effect of deteriorating the transient response of the regulator circuit itself. That is to say, a current limiting device could in effect "fight" the regulator circuitry which is attempting to supply peaks of current such as may be drawn by low duty cycle, high peak current loads such as power oscillators, etc.

In accordance with and in consideration of the disadvantages of the prior art techniques, an important object of the present invention was the development of circuits and techniques for obviating the disadvantage of placing a protective circuit in series between the output of a voltage regulator circuit and a load or utilization device, as discussed above.

For the sake of simplicity of explanation and since the elements shown in block form are well known in themselves in the prior art, the block diagram presentation is advantageous.

Figure 1:
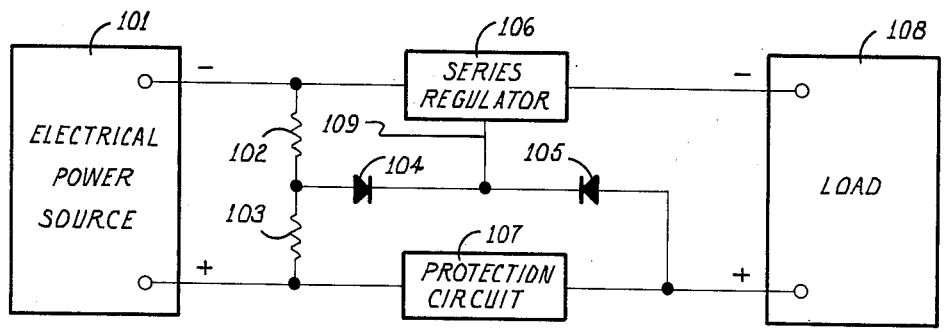
FIGURE 1 is a block diagram illustrating the application of the concept of the present invention to a series regulator and protection circuit combination.
Figure 2:
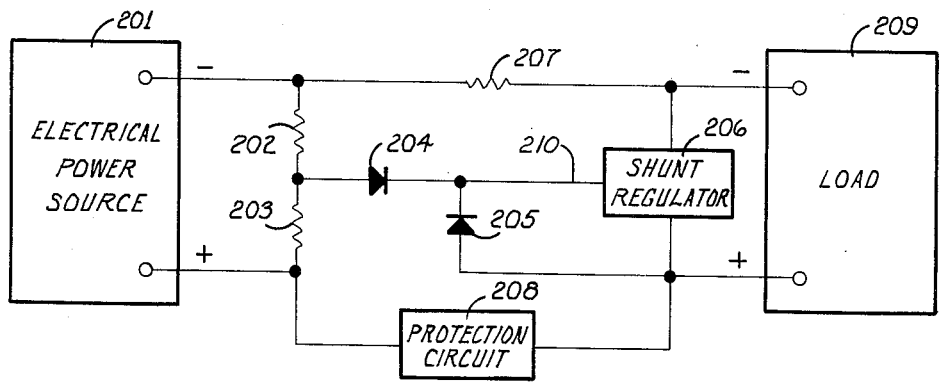
FIGURE 2 illustrates the application of the concept of the present invention to a source regulator and load system in which the regulator is of the shunt type.
Figure 3:
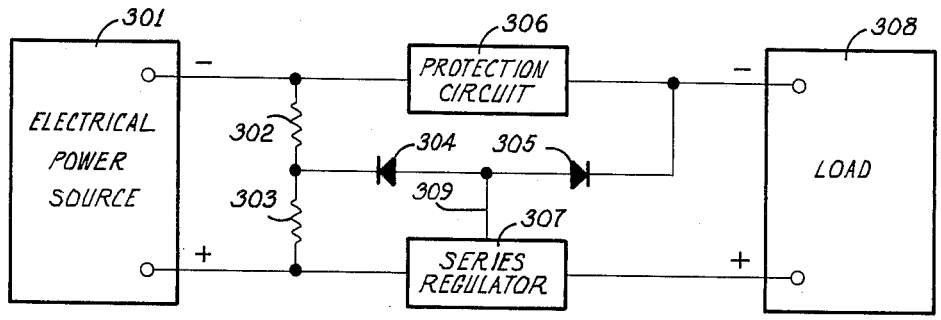
FIGURE 3 is the equivalent of FIGURE 1 for series regulator placement in the positive lead between source and load.

Referring initially to FIGURES 1, 2 and 3, it will be noted that electrical power sources 101, 201, and 301 may be similar rectifier-filter combinations, direct current generators, or other source of direct current power. Loads 108, 209 and 308 also may be expected to be similar loads or utilization devices such as presented by a system of electronic circuitry. Protection circuits 107, 208, and 306 as stated previously may be as simple as a fuse, or as complex as the first acting electronic protection circuitry referred to previously. In any event it will be noted that the series impedance represented by either 107, 208, or 306, along a source to load conductor in either of FIGURE 1, 2, or 3 (without the additional circuitry of the present invention to be described hereinafter) represents a substantial addition to the output impedance of the supply and regulator system as seen from the load terminals. Series regulator circuits usable at 106 or 307 are well known in the art, a vacuum tube version being represented by U.S. Patent Re. 21,749. A transistorized version is shown and described in U.S. Patent 2,751,549 for example. With respect to the less commonly used shunt regulator circuit 206 which actually operates in conjunction with series impedance 207, transistorized and vacuum tube versions are described in the literature. The operation of series and shunt regulator circuits in themselves being well known, it is not thought necessary to describe or discuss regulator operation per se. Suffice to say that a regulator may be regarded as a controllable variable impedance having a separate input as 109 or 210 for accepting the control parameter to effect variation of the effective regulator impedance as necessary to hold the load terminal voltage relatively constant under all design values of load current. Commonly a regulator circuit samples a portion of the output voltage, compares that portion to a fixed reference and derives the said control parameter as a feedback voltage or current.

FIGURES 1, 2 and 3, although entirely applicable in the vacuum tube art, are particularly adaptable to the transistorized regulated power supply problem.

Referring now in particular to FIGURE 1, it will be noted that the voltage divider which includes resistors 102 and 103 fractionate the output of source 101. The values of resistors 102 and 103 would typically total to a sufficiently high value to prevent excessive waste of power therein, and yet would be low enough in value such that operating variations of current flowing in diode 104 (which are small compared to the load current output into 108) do not materially load the divider circuit comprising resistances 102 and 103. 103 moreover will be small in value compared to 102 since it is desired that the voltage across 103 is adjusted to be greater than the voltage occurring across the protection circuit 107 under normal operating conditions. Since the center point between resistors 102 and 103 therefor is somewhat negative with respect to the positive output terminal of 101, diode 104 is normally cut off (back biased) and regulator 106 obtains output sensing information through diode 105 from the positive lead of load 108. It will be noted that the control parameter input to series regulator 106 (represented by lead 109) may as well be connected to the positive terminal of load 108 and diode 104 may as well be removed under these circumstances. While, and so long as, this condition persists, the regulator is sensing on the load side of the protection circuit 107 and the entire system may be regarded as one in which the protection circuit is inserted ahead of the regulator.

When either an over-current or a short circuit condition arises at the load 108, the voltage across the protection circuit 107 begins to increase due to the increased current therethrough. When this voltage drop begins to exceed the drop across resistor 103, diode 105 will begin to conduct clamping the sense point 109 effectively to the center point between resistors 102 and 103. Note that diode 104 is in its forward biased or conducting state under these conditions. The increased voltage drop across the protection circuit 107 effectively makes the positive terminal of load 108 more negative than the junction between resistors 102 and 103, thereby back biasing diode 105. Whereas for all conditions of normal operation, that is normal maximum load current or less, sensing for the regulator circuit takes place at the output terminals, under overload or short circuit conditions, the sensing reverts to the junction of resistors 102 and 103, i.e., ahead of the protection circuit. In this way the advantage of sensing at the output terminals is retained without sacrificing the protection afforded by having the overload or short circuit protection circuitry on the input to the regulator. Obviously in this way the regulator circuit itself enjoys the short circuit protection applied to the load 108 by protection circuit 107. Of course once the short circuit or overload condition is removed, the circuit automatically and quickly reverts to "output" sensing. It will be appreciated that according to the present invention, the low output impedance of the power supply is preserved where it is most important, that is within the normal current operating range of the supply.

Referring now to FIGURE 2, resistors 202 and 203 are selected in the same way as described for resistors 102 and 103 thus the voltage drop across resistor 203 is somewhat greater under normal operating conditions than the voltage drop across protection circuit 208. Once the increase in voltage drop across protection circuit 208 inspired by overload or short circuit conditions at load 209 presents itself, "switching" occurs between diode 204 and 205 in essentially the same manner as described in connection with diodes 104 and 105 and sensing lead 210 is effectively shifted so that shunt regulator 206 is controlled from the positive lead of load 209 during normal current operating conditions and from the center point between resistors 202 and 203 during overload conditions. It will of course be realized that if a shunt regulating system is designed so that the current through shunt regulator 206 between the negative and positive terminals of load 209 is designed to be negligible when the load 209 is drawing maximum rated load, essentially no dynamic range of operation for shunt regulator 206 remains to be utilized after the sensing point 210 is shifted to the input side. Accordingly, the utilization of the present invention in connection with a shunt regulator circuit requires that some dynamic capacity remain in the regulator system. This then dictates that, at full rated load, shunt regulator 206 must still draw more than an insignificant fraction of the current in load 209. Since, for power economy reasons, shunt regulator systems are ordinarily not used where substantial load currents or substantial load current variations are expected, designing "excess" current carrying capacity through 206 is not a significant penalty.

It will be understood of course, that in connection with FIGURE 1 in particular, the anode side of diode 105 could be connected to the midpoint of a divider disposed between positive and negative terminals of load 108. The circuit may be thought of in this way in order to complete the analogy to circuits such as shown in U.S. Patents 2,693,568 and 2,904,742 (regulator patents also representative of the state of the regulator art).

In FIGURE 3, it will be apparent that the functions and design criteria in connection with components 302 and 303 are the same as 103 and 102, respectively. The protection circuit 306 being in the negative power lead, and series regulator 307 being in the positive power lead, is obviously the converse of FIGURE 1 as regards 106 and 107. The presence of the series regulator in the positive lead is a matter of design choice in transistorized regulators, but is typical in vacuum tube series regulators, and hence this variation (FIGURE 3) is presented for the sake of completeness.

In view of the reversal of direction of current flow in 306 and 307 as compared to 107 and 106 respectively, the polarities of the corresponding voltage drops will also be reversed and hence diodes 304 and 305 are necessarily reversed in polarity as compared to diodes 104 and 105. Otherwise, the description and commentary on the operation of FIGURE 1 can be readily applied by those skilled in this art to the embodiment of FIGURE 3.

Once the concept of the present invention is understood and appreciated, it will be obvious to those skilled in the art that various modifications still falling within the spirit and scope of the present invention can be made. It is not intended that the patent protection sought for the present invention should be limited by the specific embodiments set forth, the drawing and description herein being illustrative only.

In accordance with the scope and breadth of the present invention, what is claimed is:

1. A direct current regulated power supply system, comprising: a source of unregulated direct current having first and second supply terminals; first and second output terminals for supplying power to a load circuit; a regulator circuit having an input for receiving control signals and having a controllable circuit path disposed in series between said first supply terminal and said first output terminal; overcurrent means for limiting the current drawn from said source, said overcurrent means being disposed in series between said second supply terminal and said second output terminal whereby any increase of current in said load circuit produces an increase in voltage drop across said overcurrent means; voltage dividing means disposed between said first and second supply terminals, for supplying a threshold voltage; a pair of diodes having first electrodes and second electrodes and being in series with said first electrodes connected together; an electrical connection from the second electrode of one of said diodes to said threshold voltage from said dividing means; an electrical connection from the second electrode of the other of said diodes to said second output terminal; and means for supplying said input of said regulator circuit from said first electrodes of said diodes, thereby to afford automatic switching of the effective signal input to said input of said regulator circuit from said output terminals to said supply terminals through said dividing means whenever said voltage drop across said overcurrent means exceeds said threshold voltage.

2. In a direct current power supply system including a source, a load, a series regulator having a control input and having its current carrying circuit disposed in one leg of the current carrying circuit between said source and said load, and wherein a current limiting device is disposed in series with the other leg of said load current carrying circuit, said current limiting device being of a type which increases the series resistance thereby inserted in said other leg when the current in said other leg exceeds a predetermined value, the combination comprising: means for developing a threshold voltage which is a predetermined fraction of the voltage appearing at the source side of said regulator and said current limiting device; means including two series connected unilateral conducting devices connected in series with like electrodes together forming a junction point and with their remaining electrodes forming a pair of terminals; means connecting one of said terminals to said threshold voltage; means connecting the other of said terminals to a side of said load corresponding in polarity to the polarity of said terminal so connected; and means connecting said junction point to said control input of said series regulator.

3. The invention set forth in claim 2 further defined in that said predetermined fraction of the voltage appearing at the source side of said regulator and said current limiting device is defined as being sufficient, for all values of said load current not exceeding a predetermined maximum, to effect back biasing of the one of said unilateral conductors which is connected to said one of said terminals and therefore to said means for developing said threshold voltage.

References Cited by the Examiner

UNITED STATES PATENTS

| | | | |
|---|---|---|---|
| 2,535,303 | 12/50 | Lewis | 307—88.5 |
| 2,697,811 | 12/54 | Deming | 323—9 |
| 2,800,585 | 7/57 | Patterson | 307—146 X |
| 2,832,900 | 4/58 | Ford | 323—22 |
| 2,851,638 | 9/58 | Wittenberg et al. | 317—33 X |
| 2,888,633 | 5/59 | Carter | 317—33 X |
| 3,049,632 | 8/62 | Staples | 323—22 |
| 3,078,410 | 2/63 | Thomas | 323—22 |
| 3,125,715 | 3/64 | Brooks | 323—22 |

LLOYD McCOLLUM, *Primary Examiner.*

MILTON O. HIRSHFIELD, *Examiner.*